United States Patent [19]
Obara

[11] Patent Number: 4,803,328
[45] Date of Patent: Feb. 7, 1989

[54] WIRE GUIDE FOR ELECTRIC DISCHARGE WIRE CUTTING

[75] Inventor: Haruki Obara, Sagamihara, Japan
[73] Assignee: Fanuc Ltd, Minamitsuru, Japan
[21] Appl. No.: 85,406
[22] PCT Filed: Nov. 12, 1986
[86] PCT No.: PCT/JP86/00578
 § 371 Date: Sep. 14, 1987
 § 102(e) Date: Sep. 14, 1987
[87] PCT Pub. No.: WO87/02920
 PCT Pub. Date: May 21, 1987
[30] Foreign Application Priority Data
 Nov. 14, 1985 [JP] Japan .................. 60-175827
[51] Int. Cl.⁴ .................. B23H 7/10; B23H 7/02
[52] U.S. Cl. .................. 219/69 W; 204/206; 219/69 D
[58] Field of Search .................. 219/69 W, 69 D; 204/206

[56] References Cited
U.S. PATENT DOCUMENTS
4,205,212 5/1980 Ullmann et al. .......... 219/69 W
4,364,812 12/1982 Inoue .................... 219/69 W
4,638,140 1/1987 Obara et al. ............ 219/69 D

FOREIGN PATENT DOCUMENTS
186534 10/1983 Japan .................. 219/69 W
156626 9/1984 Japan .

Primary Examiner—A. D. Pellinen
Assistant Examiner—Geoffrey S. Evans
Attorney, Agent, or Firm—Staas & Halsey

[57] ABSTRACT

A wire guide for wire electrode type electrical discharge machining be employed both for taper machining and for non-taper machining with high accuracy, regardless of the magnitude of the taper angle. The guide can be readily connected to (threaded with) a wire electrode and can be employed in an electrical discharge machining apparatus having an automatic wire connecting (threading) system. The wire guide is provided an arc-shaped guide arranged at a location concentric with a wire electrode for electrical discharge machining, a three-point-supporting guide arranged closely to the arc-shaped guide along the wire electrode for allowing the wire electrode to pass therethrough, and an external tube member for holding the arc-shaped guide and the three-point-supporting guide therein. The guide has a center hole for allowing the wire electrode to pass therethrough and a cooling liquid supply hole for supplying a cooling liquid for cooling the wire electrode.

4 Claims, 5 Drawing Sheets

WIRE GUIDE FOR ELECTRIC DISCHARGE WIRE CUTTING

BACKGROUND OF THE INVENTION

1. Field of the Invention

This invention relates to an improvement applicable to a wire guide for wire electrode type electrical discharge machining. More specifically, this invention relates to an improvement applicable to a wire guide for enabling the wire guide to be employed both for taper machining and for non-taper machining while realizing high machining accuracy, regardless of the magnitude of the taper angle thereof, for enabling the wire guide to be readily connected to (or threaded with) a wire electrode, and additionally for enabling the wire guide to be employed in a wire electrode type electrical discharge machining apparatus equipped with an automatic wire electrode connecting (or threading) system.

2. Description of the Related Art

Wire guides for wire electrode type electrical discharge machining available in the prior art are classified into several categories, which are described below.

a. V-groove guide

Referring now to FIG. 1, a first prior art guide type is a V-groove wire guide 1. The V-groove guide 1 has a V-shaped groove along which a wire electrode 2 is guided. Although such a wire guide 1 is readily connected to (or threaded with) a wire electrode 2, or a wire electrode 2 can be easily attached to this guide 1, this V-groove guide 1 is not suitable for taper machining.

b. Die guide

A die guide 3, as illustrated in FIG. 2, exemplifies a second type of prior art wire guides. The die guide 3 has an aperture 31 through which a wire electrode 2 passes. The die guide 3 is suitable for taper machining.

c. Three-point-supporting guide

Referring to FIG. 3, a third type of wire guide is illustrated. A three-point-supporting guide 4 is a combination of a V-groove guide member 41 and a supporting guide member 42. This three-point-supporting guide 4 supports a wire electrode 2 accurately at a required location during a machining operation. The three-point supporting guide 4 is readily connected to (or threaded with) a wire electrode 2 by moving the supporting guide member 42 apart from the V-groove guide member 41.

d. Arc-shaped guide

An arc-shaped guide 5 according to the prior art is illustrated in FIG. 4. The arc-shaped guide 5 is a type of die guide of which the radius of curvature of the surface of an aperture 51 is extremely large. A wire electrode 2 used in the arc-shaped guide 5 will not be sharply bent, even if the taper angle is large. This construction presents a large magnitude of friction from being applied to the wire electrode 2.

Each of the aforementioned prior art wire guides for wire electrode type electrical discharge machining has drawbacks, which are described below.

The V-groove guide 1 of FIG. 1, in addition to not being suitable for taper machining, has a further disadvantage wherein the wire electrode 2 is deformed, as shown by a chain line 21 rather than remaining straight. This results in deteriorating machining accuracy.

The radius of curvature of the die guide 3 of FIG. 2 is inclined to be selected somewhat small. In this case, the die guide 3 has a drawback wherein the wire electrode 2 will be sharply bent, which will result in lower precision cutting.

When the taper angle is large for the three-point-supporting guide 4 of FIG. 3, the wire electrode 2 is likely to be curled. This is because a large magnitude of taper angle causes the wire electrode 2 to be sharply bent. Once again, the resulting machining will not be highly accurate.

When the selected diameter of the aperture 51 of the arc-shaped guide 5 is small, the arc-shaped guide 5 does not have any particular drawback, insofar as the machining accuracy in taper machining is concerned. However, an arc-shaped guide 5 having a small aperture 51 cannot be used in a system employing an automatic wire connecting system (or an automatic threading system).

SUMMARY OF THE INVENTION

An object of this invention is to provide a wire guide employable for wire electrode type electrical discharge machining which can be used for high accuracy non-taper and taper machining.

Another object of the present invention is to provide a wire guide that can realize high accuracy for taper machining, regardless of the taper angle.

A further object of the present invention is to provide a wire guide that can readily connect to (or threaded with) a wire electrode.

Yet another object of the present invention is to provide a wire guide that can be employed in a wire electrode type electrical discharge machining apparatus equipped with an automatic wire connecting (or threading) system.

To achieve the foregoing objects, a wire guide employable for wire electrode type electrical discharge machining is provided, comprising an arc-shaped guide which is arranged at a location concentric with a wire electrode, a three-point-supporting guide which is arranged closely to the arc-shaped guide along the wire electrode for allowing the wire electrode to pass therethrough, an external tube member for holding the arc-shaped guide and the three-point-supporting guide therein, having a center hole for allowing the wire electrode to pass therethrough and having a cooling liquid supply hole for supplying a cooling liquid for cooling the wire electrode.

The wire guide for wire electrode type electrical discharge machining in accordance with this invention functions as an arc-shaped guide when the taper angle is large, and as a three-point-supporting guide when the taper angle is small. Accordingly, the guide function is automatically selected depending on the taper angle, and a high level of machining accuracy is realized, regardless of the magnitude of the taper angle.

When the wire guide is employed for non-taper machining, the wire guide functions as a three-point-supporting guide, realizing a high level of machining accuracy. As a result, the wire guide allows a high degree of machining accuracy both for taper machining and for non-taper machining.

When this wire guide is connected to (or threaded with) the wire electrode, the three-point-supporting guide 62 allows a supporting guide member to remove apart from a V-groove guide member to make the gap therebetween large. In addition, the diameter selected for the aperture of the arc-shaped guide is relatively large. These two parameters allow the wire guide of this invention to be readily threaded with the wire electrode. As a result, this wire guide can be employed with a wire electrode type electrical discharge machining apparatus provided an automatic wire connecting (or threading) system.

BRIEF DESCRIPTION OF THE DRAWINGS

A more detailed description will be presented below for a wire guide for wire electrode type electrical discharge machining of this invention, referring to drawings briefly described below.

DETAILED DESCRIPTION OF A PREFERRED EMBODIMENT

Referring to FIGS. 5, 6, 7 and 8, a more detailed description will be presented below.

Figure 1:
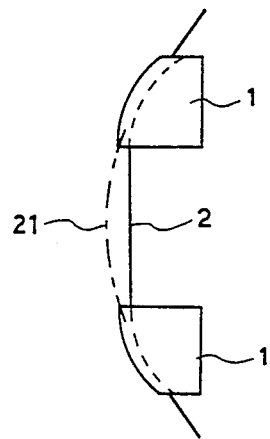
FIG. 1 is a side view of a V-groove guide available in the prior art.
Figure 2:
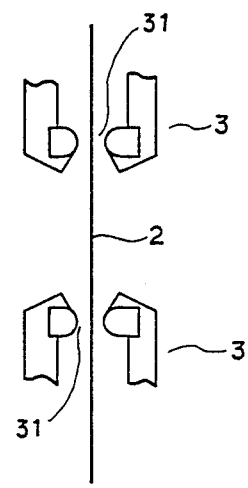
FIG. 2 is a side view of a die guide known in the prior art.
Figure 3:
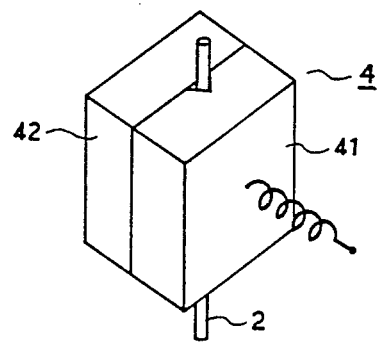
FIG. 3 is a perspective view of a three-point-supporting guide known in the prior art.
Figure 4:
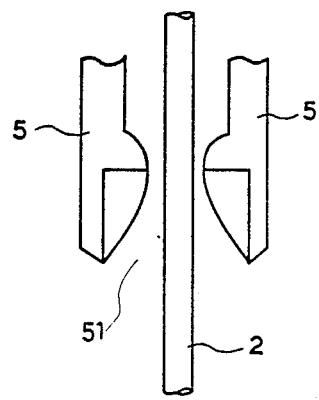
FIG. 4 is a side view of an arc-shaped guide known in the prior art.
Figure 5:
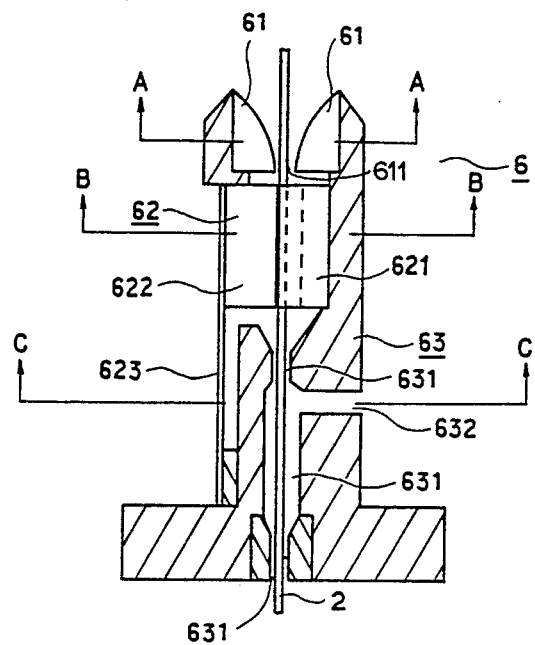
FIG. 5 is a cross-sectional view of a wire guide for wire electrode type electrical discharge machining in accordance with an embodiment of the present invention.
Figure 6:
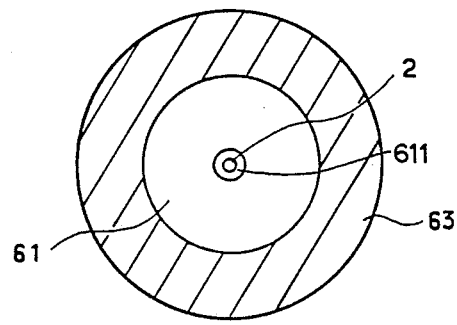
FIG. 6 is a cross-sectional view of the wire guide for wire electrode type electrical discharge machining illustrated in FIG. 5 along line A—A.

An arc-shaped guide 61 is assembled in an external tube 63, as illustrated in FIG. 5. The arc-shaped guide 61 has a central opening 611 therethrough, the diameter of which is selected to be larger (by, for example, 0.1 mm) than the diameter (usually 0.05–0.3 mm) of a wire electrode 2, to enable the arc-shaped guide 61 to be readily connected with (or threaded with) the wire electrode 2.

Figure 7:
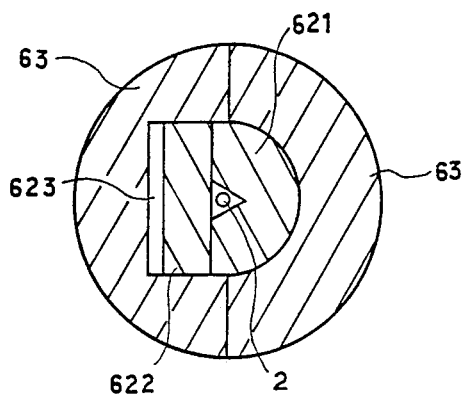
FIG. 7 is a cross-sectional view of the wire guide for wire electrode type electrical discharge machining illustrated in FIG. 5 along line B—B.
Figure 9:
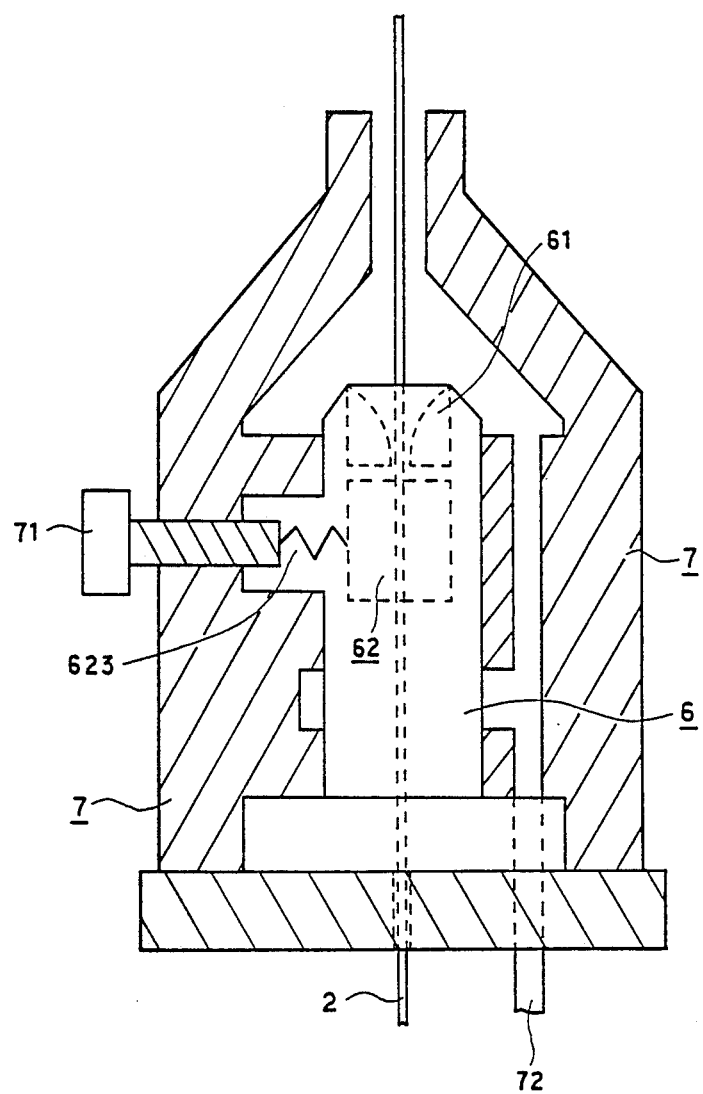
FIG. 9 is a cross-sectional view of the wire guide for wire electrode type electrical discharge machining in accordance with an embodiment of the present invention in use.

Referring now to FIGS. 5 and 7, a three-point-supporting guide 62 is also situated in the external tube 63 close to the arc-shaped guide 61. The three-point-supporting guide 62 includes a V-groove guide member 621, a supporting guide member 622 and a spring 623 (shown as a leaf spring in the FIG. 5). When the wire guide 6 is in use, the supporting guide member 622 is urged towards the V-groove guide member 621 by a spring tension adjustment means 71 (FIG. 9) against the tension of the spring 623. As a result, the wire electrode 2 is held accurately at the center of a center hole 631 of the wire guide 6. On the other hand, when the wire guide 6 is being connected to (or threaded with) the wire electrode 2, the spring tension adjustment means 71 shown in FIG. 9 is loosened, and the supporting guide member 622 is moved apart from the V-groove guide member 621. As a result, the wire guide 6 can be easily connected to (or threaded with) the wire electrode 2.

Figure 8:
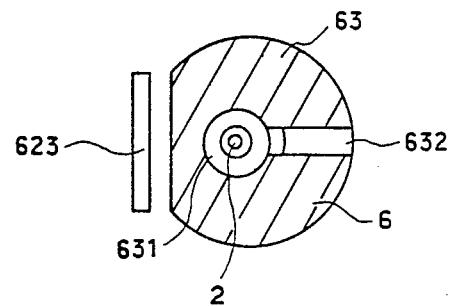
FIG. 8 is a cross-sectional view of the wire guide for wire electrode type electrical discharge machining illustrated in FIG. 5 along line C—C.

Referring to FIGS. 5 and 8, the external tube 63 holds the V-groove guide member 621 at an accurate position relative to the supporting guide member 622. Additionally, the external tube 63 allows the wire electrode 2 to pass through the internal hole 631 and supplies a cooling liquid to the wire electrode through a cooling liquid supply hole 632.

FIG. 9 illustrates, the wire guide 6 for wire electrode type electrical discharge machining in use. The wire guide 6 is arranged in a nozzle 7, which includes the spring tension adjustment means 71 for adjusting the tension of the spring 623. In the embodiment illustrated in FIG. 9, the spring 623 is a coil spring. The adjustment of the spring 623 is performed before a cooling liquid is supplied through a cooling liquid supply hole 72, which cools the wire electrode 2.

The foregoing description has clarified that this invention has successfully provided a wire guide employable for wire electrode type electrical discharge machining which has a number of superior features. The wire guide functions both as an arc-shaped guide (when the taper angle is large), and a three-point-supporting guide (when the taper angle is small). As a result, the wire guide of the present invention can be employed not only for non-taper machining but also for taper machining, while maintaining high accuracy for both types of machining, and can realize high accuracy for taper machining regardless of the taper angle. The portion of the guide to be used is automatically selected depending on the taper angle. The guide is readily connected to (or threaded with) the wire electrode, and can be employed in a wire electrode type electrical discharge machining apparatus equipped with an automatic wire connecting (or threading) system.

I claim:

1. A wire guide for guiding a wire electrode in a wire electrode type electrical discharge machining apparatus, said wire guide comprising:
   an arc-shaped guide arranged at a guiding end of said wire guide;
   a three-point-supporting guide arranged close to said arc-shaped guide in an end-to-end arrangement so that the wire electrode can pass therethrough; and
   an external tube member for holding said arc-shaped guide and said three-point-supporting guide therein, said external tube member having a center opening at a non-guiding end of said wire guide for allowing the wire electrode to pass therethrough, and a cooling liquid supply opening for supplying a cooling liquid for cooling the wire electrode.

2. A wire guide according to claim 1, wherein the cooling liquid supply opening extends radially through said external tube member from the wire electrode.

3. A wire guide according to claim 1, further comprising adjustable spring means, operatively connected to said three-point-supporting guide, for opening and closing said three-point-supporting guide.

4. A wire guide according to claim 3, wherein said arc-shaped guide has a central opening at least 0.1 mm larger than a diameter of the wire electrode.

* * * * *